United States Patent
Paczkowski et al.

(10) Patent No.: US 8,316,457 B1
(45) Date of Patent: Nov. 20, 2012

(54) PARTITIONED IP MULTIMEDIA SUBSYSTEM CALL SESSION CONTROL FUNCTION

(75) Inventors: Lyle W. Paczkowski, Mission Hills, KS (US); Kimberly J. Ganote, Lee's Summit, MO (US); Manish Mangal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1045 days.

(21) Appl. No.: 12/111,668

(22) Filed: Apr. 29, 2008

(51) Int. Cl.
*H04L 29/06* (2006.01)

(52) U.S. Cl. .............................. 726/27; 726/28; 726/29

(58) Field of Classification Search .................... 726/21, 726/26–29
See application file for complete search history.

(56) References Cited

U.S. PATENT DOCUMENTS

| | | | |
|---|---|---|---|
| 7,246,165 B2 | 7/2007 | Williams et al. | |
| 2007/0008913 A1 | 1/2007 | Naqvi et al. | |
| 2007/0091874 A1 | 4/2007 | Rockel et al. | |
| 2007/0100981 A1* | 5/2007 | Adamczyk et al. | 709/223 |
| 2008/0120694 A1* | 5/2008 | Pandey et al. | 726/2 |
| 2008/0276068 A1* | 11/2008 | Ashraf et al. | 712/20 |
| 2009/0181671 A1* | 7/2009 | Preiss et al. | 455/435.1 |

* cited by examiner

*Primary Examiner* — Justin T Darrow

(57) ABSTRACT

A network system provides IP Multimedia Subsystem (IMS) service from a network service provider to a customer. A plurality of network elements are connected to form a core domain of the network service provider. A master IMS instance is configured within the core domain and includes a core call session control function (CSCF) and a core home subscriber server (HSS). A partitioned IMS instance is configured as a virtual core within the core domain and includes a partitioned CSCF and a customer HSS accessible by a user of the customer from outside the core domain. A virtual IMS service control interface is coupled between the master IMS instance and the partitioned IMS instance so that the partitioned CSCF has access to the core CSCF for transfer of media.

12 Claims, 4 Drawing Sheets

PARTITIONED IP MULTIMEDIA SUBSYSTEM CALL SESSION CONTROL FUNCTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to network services based on the IP Multimedia Subsystem, and, more specifically, to the creation of partitioned (i.e., multiplexed) IMS services so that a customers of a network provider can obtain their own virtual IMS services without having to build their own infrastructure.

The Internet Protocol (IP) multimedia subsystem (IMS) is a standard developed by the $3^{rd}$ Generation Partnership Project (3GPP) for the purpose of delivering IP-based multimedia communications across many types of access networks, including wireless (e.g., cellular or PCS) networks. IMS defines a session control layer that interfaces between an applications layer and a transport layer. The applications layer may include any packet-based media application including voice, video, data, and other content. The transport layer handles many different types of access networks including mobile wireless, ISP's, enterprise systems, and PSTN.

The session control layer uses pre-existing Internet protocols (e.g., the session initiation protocol, or SIP) for registering end-user devices and routing signaling messages between users and applications. Two main elements of the session control layer are the call session control function (CSCF) and the home subscriber server (HSS). The CSCF performs session set-up, modification, and termination through the interaction of a proxy CSCF (P-CSCF), an interrogating CSCF (I-CSCF), and a serving CSCF (S-CSCF). As the central node of the signaling plane, the S-CSCF is registrar for each user session with an application. It also handles authentication of the user. The P-CSCF is the user's entry point into the IMS domain. It protects the S-CSCF from direct exposure to the access networks, and all SIP messages pass through the P-CSCF during the entire session. The I-CSCF is a SIP function located at the edge of an administrative domain between the P-CSCF and S-CSCF. Its address is published in a DNS of the domain so that the user terminal can find it via the P-CSCF. The I-CSCF contacts the HSS to determine the correct S-CSCF associated with the user request, and then become the forwarding point for SIP messages during the session.

In a typical implementation, IMS is a network domain having various discrete elements performing the functions of at least the call session control functions and the home subscriber server. Whether implemented by a private enterprise or a public network provider, the IMS domain may also include 1) at least one application server in the applications layer, and 2) a media gateway control function (MGCF), a subscriber location function (SLF), and a policy decision function (PDF) in the session control layer. Due to the multitude of functional elements, it is expensive to create an IMS domain. Because of the high cost, an IMS core will only be created when its benefits justify the cost. For a telecommunications service provider, an IMS domain can enable the integration of wireless services with traditionally wireline-based services such as PBX. Calls to one single phone number assigned to a user will simultaneously ring their desk phone and cellular phone. Voicemail and other services are also integrated and accessible from either phone. By handling such applications in an all-IP network, the service provider obtains improved efficiency of service and it can more easily deploy many types of multimedia applications.

For an enterprise that is not a mobile service provider, the expense of an IMS domain often makes it impractical to create such a system. However, many such enterprises need to deliver multimedia applications to their internal and external users in a secure environment using IMS. Therefore, it would be desirable to extend the functionality of operating an IMS core to an enterprise without incurring the associated high costs.

SUMMARY OF THE INVENTION

The present invention overcomes the disadvantages of the prior art by allowing a business enterprise or other institution to serve IMS applications to their user community without investing in its own IMS infrastructure. An IMS domain of a network provider (e.g., a mobile network operator) is leveraged in the present invention by creating a shared SIP-session control which is leased out to the enterprise. The upfront costs are reduced to those for generating a customized partition within the existing IMS domain to implement the unique functions of the lessee (i.e., tenant) and to enable the unique functions to access the core functions.

In one aspect of the invention, a network system provides IP Multimedia Subsystem (IMS) service from a network service provider to a customer. A plurality of network elements is connected to form a core domain of the network service provider. A master IMS instance is configured within the core domain and includes a core call session control function (CSCF) and a core home subscriber server (HSS). A partitioned IMS instance is configured as a virtual core within the core domain and includes a partitioned CSCF and a customer HSS accessible by a user of the customer from outside the core domain. A virtual IMS service control interface is coupled between the master IMS instance and the partitioned IMS instance so that the partitioned CSCF has access to the core CSCF for transfer of media.

DETAILED DESCRIPTION OF PREFERRED EMBODIMENTS

The present invention provides a system through which a network service operator (herein a "lessor") deploys a host or core IMS platform which is partitioned to create a separate, distinct, and logical SIP-proxy environment for the explicit use of an independent enterprise (herein a "lessee"), while allowing the SIP proxy to obtain specific information from the core IMS platform CSCF within the operator's infrastructure. The use of both master and slave (i.e., partitioned) SIP proxies allows for inter-domain, inter-operator media transfer in a predefined manner while ensuring integrity of the media and facilitating an accounting of the sessions or events using IMS billing and mediation platforms. Pursuant to one important embodiment, the invention partitions off a portion of the IMS logic within a core domain by implementing an additional instance of the IMS logic and configuring it to manipulate media applications of a leasing enterprise and permitting outside access to the partition by the leasing enterprise and its users. Consequently, the same IMS infrastructure can be shared by the network operator with a fee-based lessee to virtualize an IMS core according to the needs of the lessee. To provide a conduit between the virtual core containing the partitioned IMS instance and the real core containing the master IMS instance, a specialized and unique IMS service control (ISC) interface is created which is similar to a conventional network-network interface (NNI). The core network operator can create the customized portions of the ISC for an additional fee.

Figure 1:
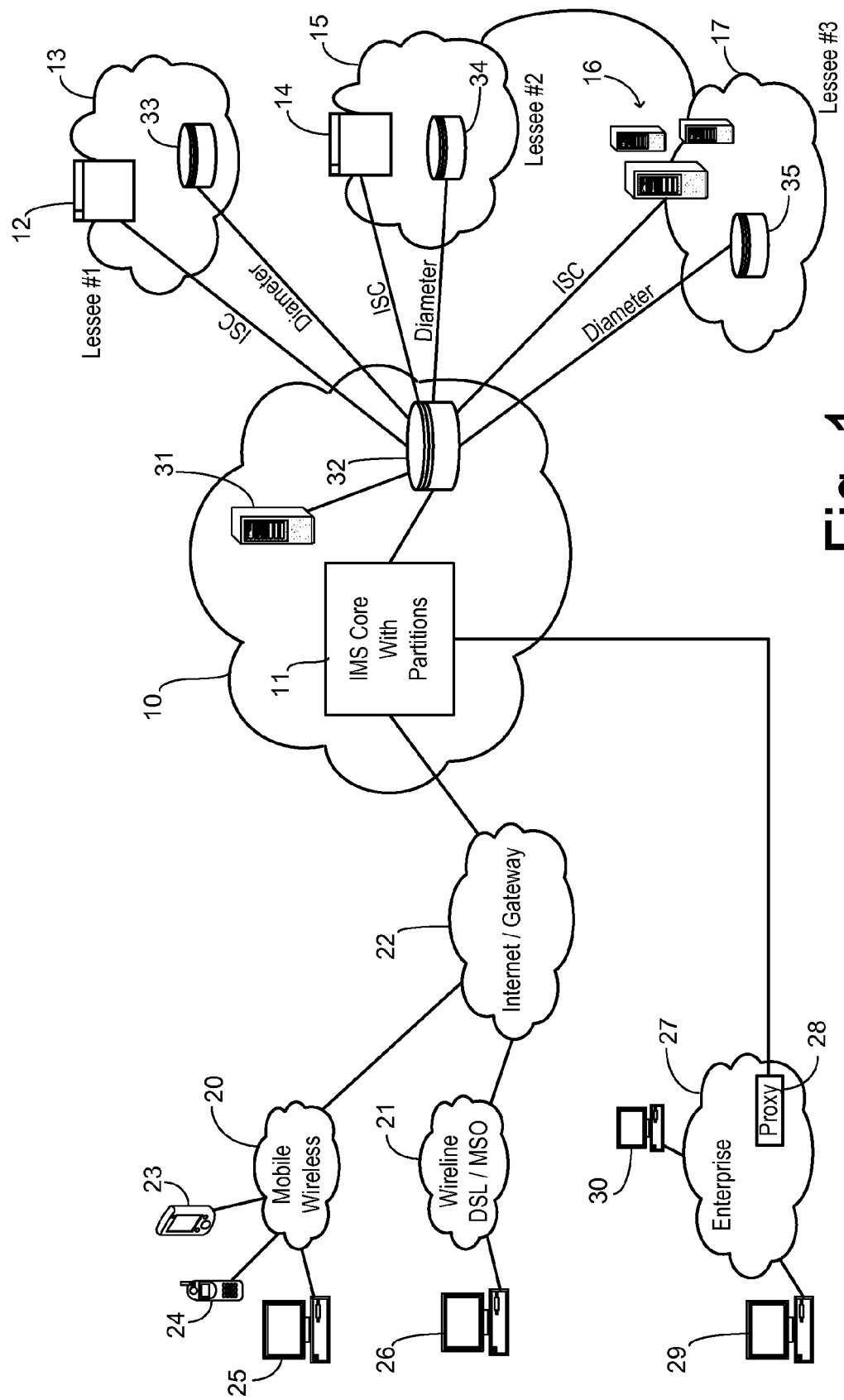
FIG. 1 is a block diagram showing an overall core network architecture useful in one embodiment of the present invention.

Referring now to FIG. 1, a core domain 10 operated by a network service provider having excess capacity or creating capacity for lease includes an IMS core 11, which is partitioned as described herein. A lessee uses the IMS services from IMS core 11 to make their applications accessible to their users. Thus, lessees #1-3 have respective applications 12, 14, and 16 residing on respective networks 13, 15, and 17 (which networks may comprise their own domains or may be located on any other network or networks reachable from core domain 10). Applications 12 and 14 may comprise standalone hosted applications. Application 16 may comprise a suite of applications or collaborative services involving cooperating applications from one or more providers or lessees, for example. Networks 15 and 17 may be interconnected so that the respective leasing enterprises can provide collaborative applications that are likewise made available to user via IMS core 11.

Users can access IMS core 11 through any available network interconnection. Thus, a mobile wireless network 20 and an ISP network 21 (comprising wireline DSL or MSO connections, for example) interface to IMS core 11 in core domain 10 via intervening gateway or Internet 22. End user terminals 23-26 coupled to networks 20 and 21 preferably include SIP User Agents for interacting with IMS core 11 to set up media sessions to a desired application selected from applications 12, 14, or 16. In another example, an enterprise network 27 includes a local proxy 28 that may perform a subset of SIP functions in collaboration with IMS core 11 to provide SIP services to end user terminals 29 and 30 each accessible to users within the enterprise and running a respective SIP User Agent.

A policy and charging rules function (PCRF) element 32 is coupled to IMS core 11 and to applications 12, 14, 16, and 31. In addition, PCRF 32 is coupled to policy servers 33-35 in remote networks 13, 15, and 17, respectively. As in a conventional IMS, PCRF 32 interfaces with applications through a respective ISC and with remote policy servers via respective Diameter protocol interfaces. So that proxy 28 in network 27 and IMS core 11 can share SIP proxy functions, they are coupled by a respective ISC interface. Core domain 10 may also include an application server 31 through which the network provider can host additional applications to be made available to the end users.

Figure 2:
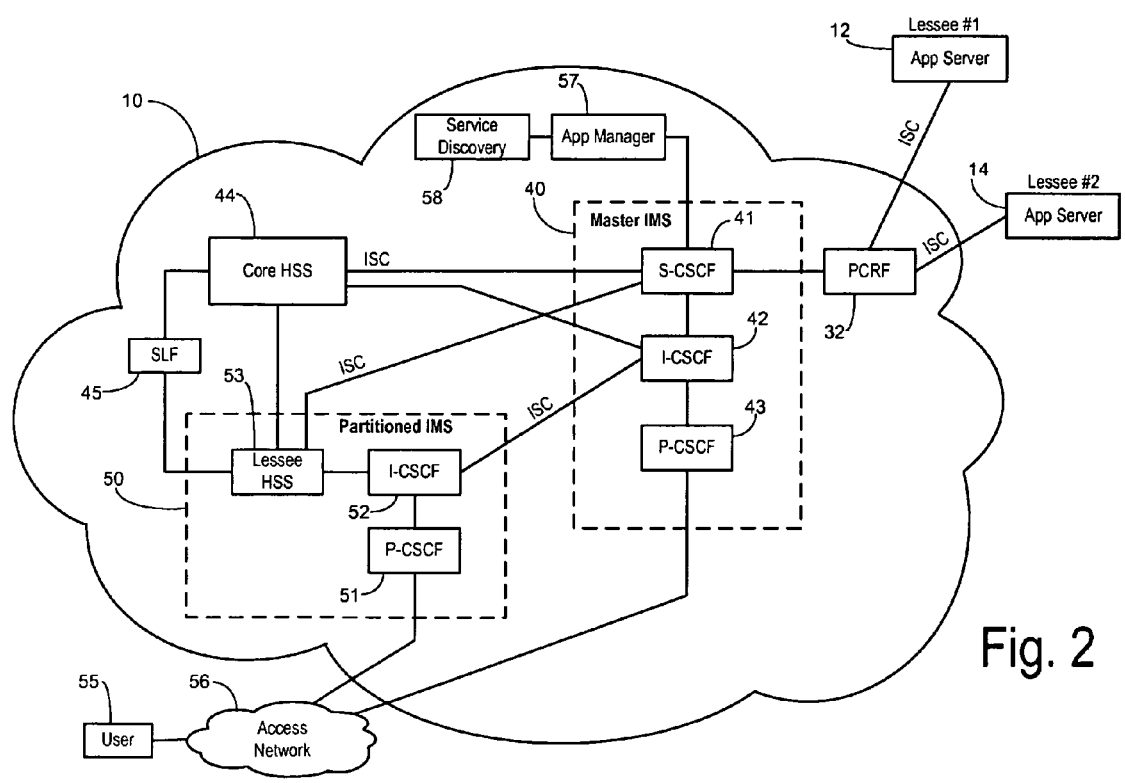
FIG. 2 is a block diagram showing one embodiment of a partitioned IMS core of the invention in greater detail.

The IMS core is shown in greater detail in FIG. 2. A main instance or master IMS 40 is configured within a plurality of network elements that are connected to form core domain 10 by the network service provider in a known manner. Master IMS 40 includes the core intelligence and configuration details according to the set up of core domain 10. Preferably, master IMS includes a core call session control function (CSCF) having a serving-CSCF 41, an interrogating-CSCF 42, and a proxy-CSCF 43, although, for purposes of the present invention, it may alternatively utilize only an S-CSCF 41. Master IMS instance 40 is coupled with a core home subscriber server (HSS) 44 as known in the art. Core HSS 84 is coupled to a subscriber location function (SLF) 45 that allows the location a subscriber's profile to be determined when there are multiple HSS databases being used, as known in the art.

Figure 3:
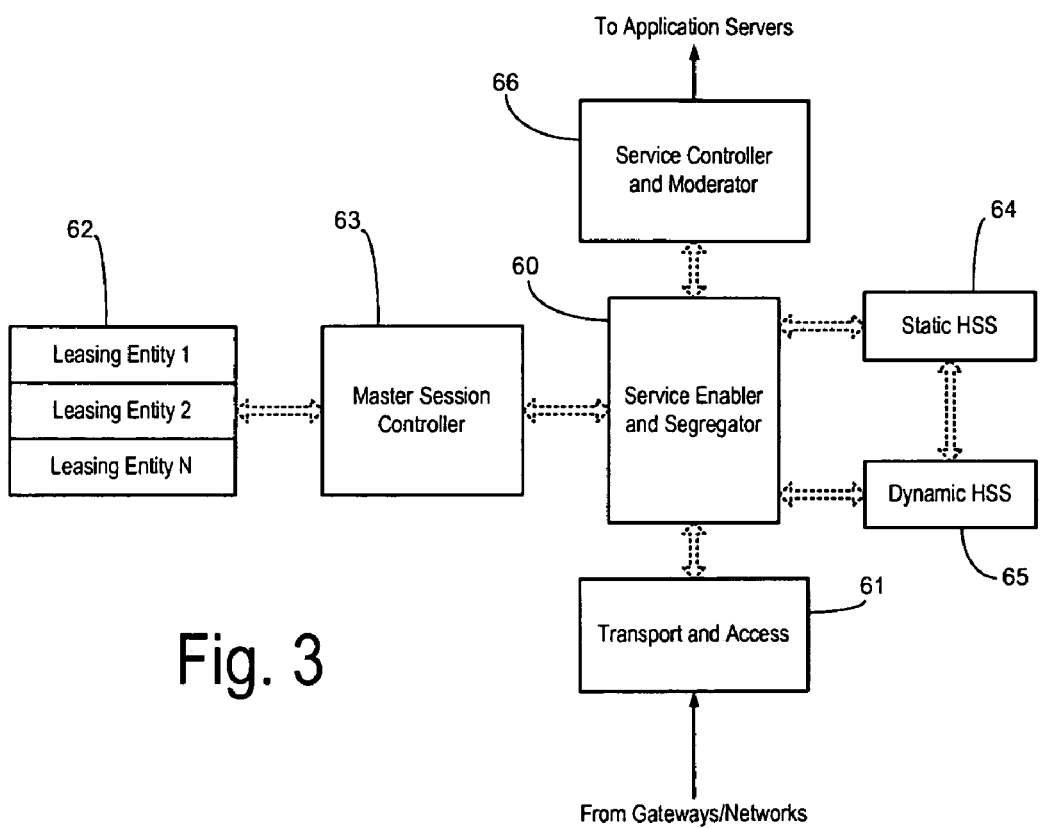
FIG. 3 is a block diagram showing interactions within one embodiment of the invention.

A partitioned IMS instance 50 is configured as a virtual core within core domain 10 (i.e., using the same plurality of network elements that are connected to form core domain 10). Partitioned IMS instance 50 includes a partitioned CSCF accessible by users from outside the core domain 10, wherein the partitioned CSCF includes a proxy-CSCF 51. Partitioned IMS instance 50 may further include an interrogating-CSCF or it can rely on I-CSCF 42 in master instance 40. When I-CSCF 52 and I-CSCF 42 are both present, they can be interfaced by ISC in order to provide chained services (i.e., one I-CSCF acts as part of a service chain in the logic of another I-CSCF). Although only one partitioned IMS instance 50 is shown in FIG. 2, core domain 10 may preferably be configured having a plurality of different partitioned IMS instances for respective lessees (e.g., as shown in FIG. 3), and the different partitioned IMS instances can link together to provide chained or collaborative services.

Partitioned IMS 50 includes a lessee HSS 53 which may contain all or a portion of the user profiles associated with a particular lessee. In the event that the network service provider owning core domain 10 shares users with the leasing enterprise, then the corresponding user profile would be stored in only one HSS, and the location of the user profile is determined by HSS 44 or 53 using SLF 45. Wherever it may be stored, the user profile comprises service point triggers (SPTs) or other filters defining the media applications and their respective operational parameters to be served to the user. The service point triggers are transferred to the core CSCF function in master IMS 40 via a respective ISC interface so that the S-CSCF 41 can control a call session between the user and a specified media application.

A user 55 connected to an access network 56 utilizes core domain 10 to initiate transfer of media with a media application as follows. User 55 is configured with or discovers an address corresponding to a P-CSCF. If user 55 is a user of the main network service provider, then it uses the address for P-CSCF 43 in master IMS 40. When user 55 is a user of the leasing enterprise, then it discovers the address for P-CSCF 51 in partitioned IMS instance 50 and directs a service request for a desired media application to P-CSCF 51. If the request is valid, P-CSCF 51 transfers it to I-CSCF 52 which accesses lessee HSS 53 to determine proper handling of the request. Based on the determined identity of the appropriate S-CSCF, the request is forwarded to master IMS 40. In response, S-CSCF 41 controls a call session with the respective application server 12 or 14 via PCRF 32 according to desired service policies, charging, and other aspects of brokering the media session to be established between the user and application server.

S-CSCF 41 utilizes an application manager 57 and service discovery 58 to look-up the identities, features, and locations of the supported applications.

The IMS service control (ISC) interfaces in the present invention specify the way in which the CSCF elements and the application servers interact with one another. Specific ISC interfaces are created for each leasing enterprise since no two application servers or lessee configurations will be exactly alike. ISC interfaces are bidirectional interfaces that use SIP to specify standardized messages exchanged between the core CSCF and the application servers. In addition, portions of the ISC interfaces between the master IMS instance and the partitioned IMS instances of the present invention would not require compliance with published SIP protocol standards since they operate only within core domain 10. The ability to use non-standardized messages increases the flexibility in creating interactions between the IMS instances to implement desirable features for the leasing enterprise.

The ISC interfaces support service invocation, transmit SIP parameters to applications, and interact with the SIP proxies for service provisioning. Thus, the initial incoming request handled by a respective P-CSCF and I-CSCF triggers an initial SIP request at the S-CSCF. The S-CSCF proxies a service request to the corresponding application based on triggers determined from the user profiles. The application server responds by acting as a user agent, proxy server, or a back-to-back user agent, for example. The application server may record and route SIP requests to stay in the signaling path. The core CSCF maintains the states between dialogs sent to or from the application servers and it interacts with the respective proxies, resulting in unique states between the master IMS instance and the partitioned IMS instance.

The ISC interface supports service point triggers (SPTs) identified in a user profile for the SIP methods at the core CSCF (e.g., triggers such as REGISTER, INVITE, SUBSCRIBE, AND MESSAGE). Data in the SPTs can include presence or absence of any header, content of any header, direction of a request, and session description information, for example.

With respect to the ISC interfaces between the master and partitioned IMS instances and between the master IMS and the application servers, the "P-functions" are customized to control the interactions. RFS standard 3261 from the Internet Engineering Task Force (IETF) defines private headers (P-Headers) for SIP messages which are the vehicle for exchanging control mechanisms in an IMS environment. As SIP requests and messages are processed in the IMS control plane, the P-Headers are inserted and made available. The application servers or other recipients can act on them, enhance them, and use them for conveying additional information. P-Headers especially useful for defining the relationship between the master and partitioned IMS instances are as follows:

- P-Asserted-Identity (RFC3325): carries valid and authenticated public user identity from the IMS control plane to the IMS Application Server.
- P-Charging-Vector (RFC3455): carries charging correlation information from IMS control plane to the IMS Application Server.
- P-Charging-Function-Addresses (RFC3455): carries offline and online charging function addresses from the IMS control plane to the IMS Application Server.

By defining a customized ISC interface according to the services to be provided to a leasing enterprise, the network service provider can utilize its core IMS to provide secure services to the leasing enterprise. With respect to incoming session requests from a user, the customized ISC ensures that SIP messages directed to a partitioned P-CSCF are processed and forwarded to an appropriate S-CSCF so it can analyze them based on initial filter criteria from the user profile obtained from the HSS subscriber data and then routes them to an appropriate application server. This allows the application server to then act as a user agent server, SIP proxy, or a redirect server. The SIP application server may also initiate its own SIP requests passed back to the core IMS instance consistent with a border control scheme implemented by the core domain.

FIG. 3 is a block diagram showing functional layers in an alternative layout for envisioning the present invention. A service enabler and segregator 60 functions as a central proxy in the IMS core. It receives SIP requests and sends SIP responses to and from users accessible from various gateways or networks via a transport and access layer 61. Various session sub-controllers 62 are provided for respective leasing entities which are coupled to a master session controller 63 that functions as a linker to service enabler and segregator 60. A static HSS 64 containing data of the network service provider's users and a dynamic HSS 65 containing data of the leasing entities' users (e.g., triggers, filters, and policy decision functions) are coupled to service enabler and segregator 60. A service controller and moderator 66 couples service enabler and segregator 60 to the application servers, and corresponds with the policy and charging rules function.

Figure 4:
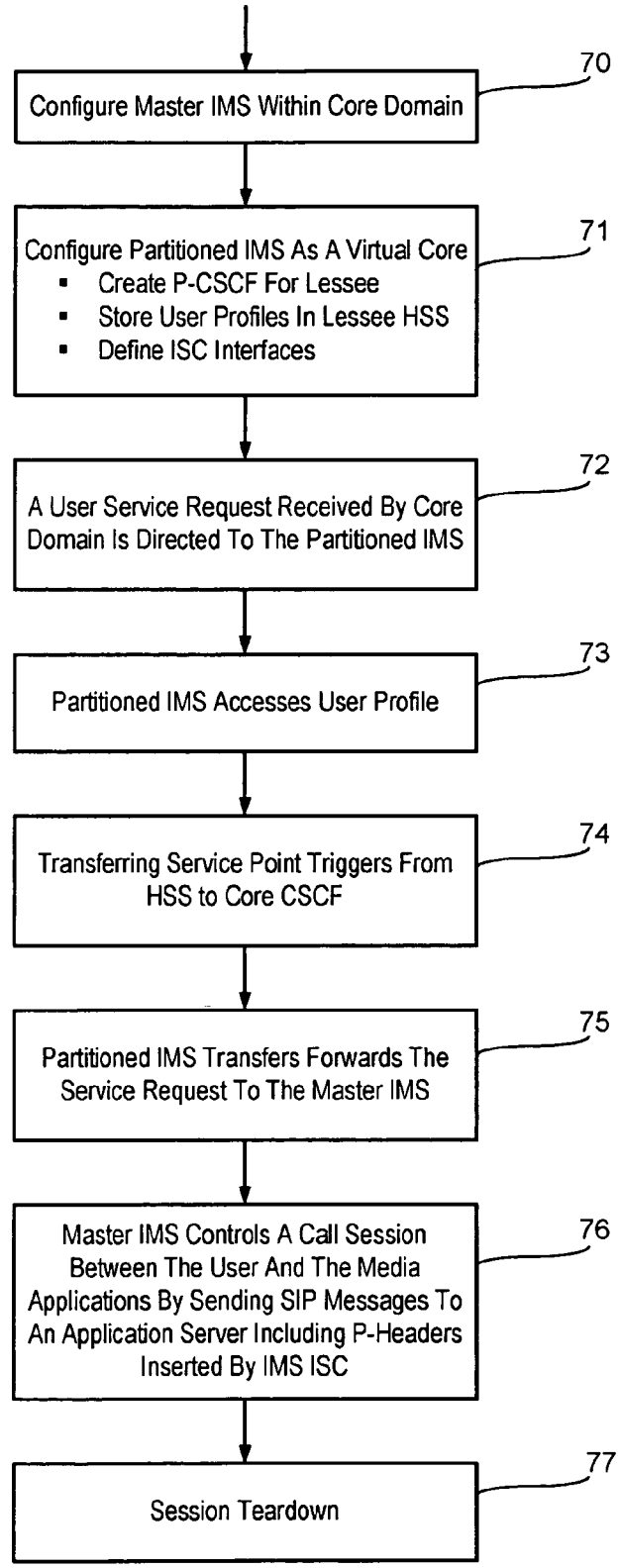
FIG. 4 is a flowchart showing one preferred embodiment of the invention.

A preferred method of the invention is shown in FIG. 4. A master IMS instance is configured within the core domain of the network service provider in accordance with the services and users of the network service provider. In step 71, a partitioned IMS instance is configured as a virtual core within the core domain for a leasing enterprise (i.e., tenant) Configuring the partitioned IMS instance includes creating a P-CSCF for the lessee, storing user profiles in the lessee HSS, and defining ISC interfaces similar to a network-network interface as known for linking separate IMS core domains. The configuring of the partitioned IMS instance is typically an ongoing task because the applications and users corresponding to a particular lessee evolve.

In step 72, a user service request is received by the core domain from a user desiring to access an application. The user service request is directed to the partitioned IMS instance when the user service request corresponds to a leasing enterprise. The partitioned IMS instance accesses the user profile in step 73 and transfers service point triggers from the HSS to the core CSCF in step 74. The partitioned IMS instance forwards the service request to the master IMS in step 75. In step 76, the master IMS instance controls a call session between the user and the identified media applications by sending SIP messages to an application server, wherein the SIP messages include P-Headers inserted by the IMS ICS interface. Consequently, the user interacts with the served media application within the call session established by the master IMS. When the user signals that the session is complete, the session is torn down by the IMS core in step 77.

What is claimed is:

1. A network system of a network service provider for providing IP Multimedia Subsystem (IMS) service to users within a leasing entity, the leasing entity providing a media application to the users, the network system comprising:
    a plurality of network elements connected to form a core domain operated by the network service provider;
    a master IMS instance configured within the core domain and including a core call session control function (CSCF) with a master CSCF address;
    a partitioned IMS instance configured as a virtual core within the core domain and including 1) a partitioned CSCF with a partitioned CSCF address accessible by the users from outside the core domain and 2) a leasing-entity home subscriber server (HSS) storing user profiles identifying an application server providing the media application, wherein the leasing-entity HSS is accessed to obtain a corresponding user profile when a user of the leasing entity accesses the partitioned IMS using the partitioned CSCF address; and an IMS service control interface between the master IMS instance, the partitioned IMS instance, and the application server so that the partitioned CSCF has access to the core CSCF via the master CSCF address for establishing transfer of media according to the media application as defined in the user profile.

2. The network system of claim 1 wherein the IMS service control interface comprises service point triggers transferred to the core CSCF from the leasing-entity HSS in response to a user profile.

3. The network system of claim 1 wherein the IMS service control interface sends session initiation protocol (SIP) messages to an identified application server including P-Headers inserted by the IMS service control interface in response to the user profiles.

4. The network system of claim 1 further comprising an application server coupled to the core domain for implementing the media application, wherein the master IMS instance is configured for accessing the application server, and wherein the partitioned IMS instance accesses the application server through the IMS service control interface and the master IMS instance.

5. The network system of claim 1 further comprising a core home subscriber server (HSS), wherein the core HSS and the leasing-entity HSS are coupled via the IMS service control interface for sharing user data between the master IMS instance and the partitioned IMS instance.

6. The network system of claim 1 wherein the partitioned CSCF includes a Proxy-CSCF and wherein the core CSCF includes a Serving-CSCF.

7. The network system of claim 1 wherein the partitioned CSCF and the core CSCF each include a respective Interrogating-CSCF.

8. The network system of claim 7 wherein the Interrogating-CSCFs are chained together.

9. The network system of claim 1 further comprising:

a second partitioned IMS instance for a second leasing entity configured as a virtual core within the core domain and including 1) a second partitioned CSCF with a second partitioned CSCF address accessible by users of the second leasing entity from outside the core domain and 2) a second leasing-entity home subscriber server (HSS) storing user profiles identifying an application server providing a second media application, wherein the second leasing-entity HSS is accessed to obtain a corresponding user profile when a second user of the second leasing entity accesses the second partitioned IMS using the second partitioned CSCF address;

wherein the IMS service control interface further interfaces between the master IMS instance and the second partitioned IMS instance so that the second partitioned CSCF has access to the core CSCF via the master CSCF address for establishing transfer of media according to the second media application as defined in the second user profile, and wherein the IMS service control interfaces between the first and second partitioned IMS instances to enable sharing of services between the leasing entities.

10. A method of providing IP Multimedia Subsystem (IMS) service from within a core domain operated by a network service provider to users of a leasing entity, comprising the steps of:

configuring an instance of a master IMS within the core domain including a core call session control function (CSCF) with a master CSCF address;

configuring a partitioned IMS instance as a virtual core within the core domain and including 1) a partitioned CSCF with a partitioned CSCF address accessible by the users from outside the core domain and 2) a leasing-entity home subscriber server (HSS) storing user profiles identifying an application server providing a media application of the leasing entity;

directing a service request for the media application addressed to the partitioned CSCF address and received by the core domain to the partitioned IMS;

the partitioned IMS determining proper handling of the request by accessing a user profile of the user;

the partitioned IMS forwarding the service request to the master IMS via the master CSCF address; and the master IMS controlling a call session between the user and the media application.

11. The method of claim 10 further comprising the step of:

transferring service point triggers to the core CSCF from the leasing-entity HSS in response to a user profile.

12. The method of claim 10 wherein the step of the master IMS controlling a call session includes sending session initiation protocol (SIP) messages to an identified application server including P-Headers inserted by an IMS service control (ISC) interface in response to the user profiles.

* * * * *